United States Patent
Ben-Shlomo

(10) Patent No.: US 10,063,318 B2
(45) Date of Patent: Aug. 28, 2018

(54) COMBINING UPLINK RADIO FREQUENCY (RF) COMMUNICATIONS SIGNALS IN A REMOTE UNIT IN A WIRELESS DISTRIBUTION SYSTEM (WDS) USING A DIFFERENTIAL MIXER

(71) Applicant: Corning Optical Communications Wireless Ltd, Airport City (IL)

(72) Inventor: Dror Ben-Shlomo, Modi'in (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 0 days.

(21) Appl. No.: 15/366,144

(22) Filed: Dec. 1, 2016

(65) Prior Publication Data
US 2018/0159628 A1 Jun. 7, 2018

(51) Int. Cl.
| H04B 10/25 | (2013.01) |
| H04B 10/2575 | (2013.01) |
| H04W 72/04 | (2009.01) |
| H04W 4/06 | (2009.01) |
| H04B 1/00 | (2006.01) |

(52) U.S. Cl.
CPC ........ *H04B 10/25753* (2013.01); *H04W 4/06* (2013.01); *H04W 72/04* (2013.01); *H04B 1/0007* (2013.01); *H04B 10/2504* (2013.01)

(58) Field of Classification Search
CPC ......... H04B 10/25753; H04B 10/25759; H04J 14/08
See application file for complete search history.

(56) References Cited

U.S. PATENT DOCUMENTS

| 3,752,923 | A | * | 8/1973 | Burke | ..................... H04L 27/12 332/101 |
| 7,415,257 | B2 | | 8/2008 | Chou et al. | |
| 2009/0154595 | A1 | * | 6/2009 | Choksi | ................... H03D 3/009 375/295 |
| 2011/0110463 | A1 | * | 5/2011 | Chang | ................... H03D 7/1458 375/316 |
| 2012/0249242 | A1 | * | 10/2012 | Goldfarb | ................. H03F 3/211 330/253 |

(Continued)

FOREIGN PATENT DOCUMENTS

EP 1181779 B1 8/2007

*Primary Examiner* — Dzung Tran
(74) *Attorney, Agent, or Firm* — C. Keith Montgomery

(57) ABSTRACT

Embodiments of the disclosure relate to combining uplink radio frequency (RF) communications signals in a remote unit in a wireless distribution system (WDS) using a differential mixer. A remote unit in a WDS receives a first uplink RF communications signal(s) and a second uplink RF communications signal(s). A differential mixer, which is typically configured to combine a pair of differential input signals, is controlled to combine the first uplink RF communications signal(s) and second uplink RF communications signal(s) without requiring the first uplink RF communications signal(s) and second uplink RF communications signal(s) to be converted into the pair of differential input signals. As a result, it may be possible to eliminate a signal combiner and a BalUn circuit from the remote unit, thus helping to save component costs and board space, and to reduce insertion loss and ripple to improve uplink signal quality in the remote unit.

25 Claims, 9 Drawing Sheets

(56) References Cited

U.S. PATENT DOCUMENTS

| | | | |
|---|---|---|---|
| 2013/0028356 A1* | 1/2013 | Heck | H03D 7/1441 |
| | | | 375/344 |
| 2014/0139042 A1* | 5/2014 | Choksi | H04B 1/18 |
| | | | 307/112 |
| 2015/0195055 A1* | 7/2015 | Ben-Shlomo | H04L 5/1423 |
| | | | 370/278 |
| 2015/0326257 A1* | 11/2015 | Xi | H03D 7/1491 |
| | | | 455/90.2 |

* cited by examiner

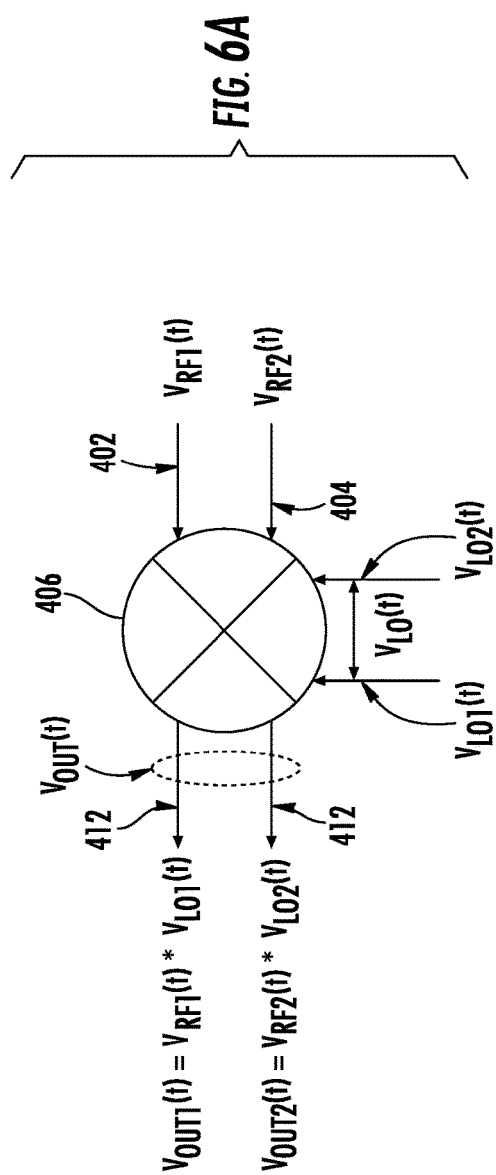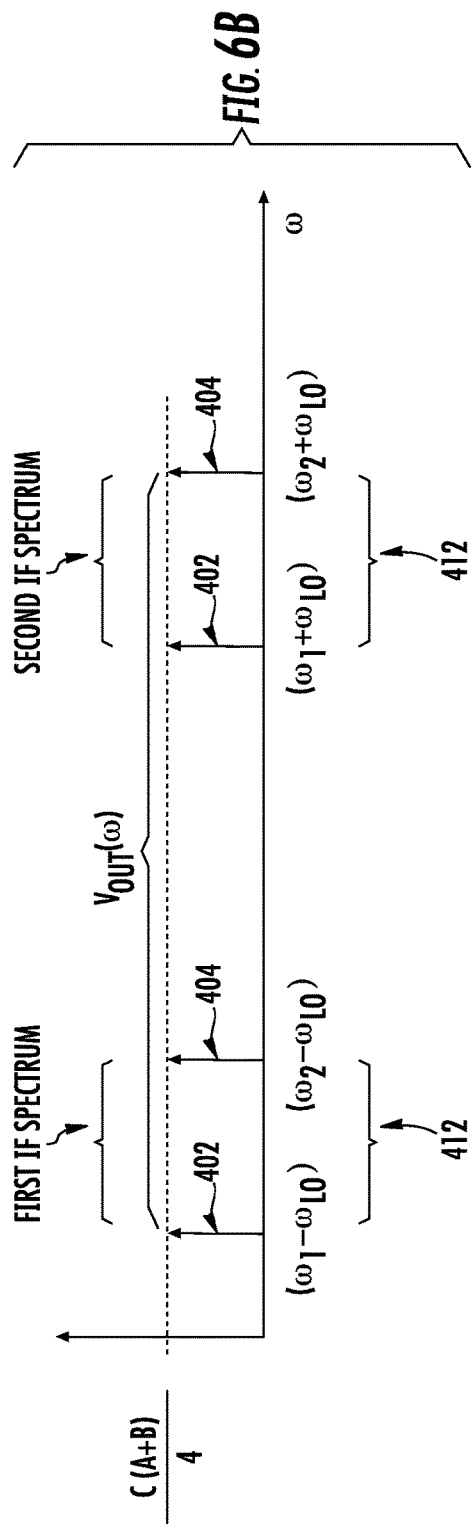

COMBINING UPLINK RADIO FREQUENCY (RF) COMMUNICATIONS SIGNALS IN A REMOTE UNIT IN A WIRELESS DISTRIBUTION SYSTEM (WDS) USING A DIFFERENTIAL MIXER

BACKGROUND

The disclosure relates generally to suppressing intermodulation product(s) in a wireless distribution system (WDS), such as a distributed antenna system (DAS), and more particularly to combining uplink radio frequency (RF) communications signals in remote units in the WDS.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of DASs. DASs include remote units configured to receive and transmit communications signals to client devices within the antenna range of the remote units. DASs can be particularly useful when deployed inside buildings or other indoor environments where the wireless communications devices may not otherwise be able to effectively receive radio frequency (RF) signals from a source.

In this regard, FIG. 1 illustrates distribution of communications services to remote coverage areas 100(1)-100(N) of a wireless distribution system (WDS) provided in the form of a DAS 102, wherein 'N' is the number of remote coverage areas. These communications services can include cellular services, wireless services, such RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a central unit 106 (e.g., a head-end equipment, a head-end controller, or a head-end unit). The central unit 106 may be communicatively coupled to a signal source 108, for example, a base transceiver station (BTS) or a baseband unit (BBU). In this regard, the central unit 106 receives downlink communications signals 110D from the signal source 108 to be distributed to the remote units 104(1)-104(N). The remote units 104(1)-104(N) are configured to receive the downlink communications signals 110D from the central unit 106 over a communications medium 112 to be distributed to the respective remote coverage areas 100(1)-100(N) of the remote units 104(1)-104(N). Each of the remote units 104(1)-104(N) may include an RF transmitter/receiver and a respective antenna 114(1)-114(N) operably connected to the RF transmitter/receiver to wirelessly distribute the communications services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

In a non-limiting example, a selected remote unit, such as the remote unit 104(2) among the remote units 104(1)-104(N), receives an uplink communications signal 110U in multiple radio frequency (RF) channels or bands. For example, the selected remote unit 104(2) may receive a first uplink communications signal in an 830-845 MHz band and a second uplink communications signal in a 2010-2025 MHz band. As such, the selected remote unit 104(2) combines the first uplink communications signal and the second uplink communications signal into a combined uplink communications signal 110U before communicating the uplink communications signal 110U to the central unit 106. In this regard, it may be desired to combine the first uplink communications signal and the second uplink communications signal into the uplink communications signal 110U without the need for additional electrical components at the selected remote unit 104(2) that may otherwise increase costs.

No admission is made that any reference cited herein constitutes prior art. Applicant expressly reserves the right to challenge the accuracy and pertinency of any cited documents.

SUMMARY

Embodiments of the disclosure relate to combining uplink radio frequency (RF) communications signals in a remote unit in a wireless distribution system (WDS) using a differential mixer. In this regard, in exemplary aspects disclosed herein, one or more remote units in a WDS are configured to receive a first uplink RF communications signal(s) and a second uplink RF communications signal(s). A differential mixer, which is typically configured to combine a pair of differential input signals, is controlled to combine the first uplink RF communications signal(s) and the second uplink RF communications signal(s) without requiring the first uplink RF communications signal(s) and the second uplink RF communications signal(s) to be converted into the pair of differential input signals. As a result, as an example, combining the first uplink RF communications signal(s) and the second uplink RF communications signal(s) using a differential mixer may make it possible to eliminate certain other electrical components. For example, it may be possible to eliminate the need to provide a signal combiner and/or a BalUn circuit in an uplink communications signal path. A signal combiner has been conventionally included in an uplink communications signal path of a remote unit to combine the first uplink RF communications signal(s) and the second uplink RF communications signal(s) into a combined uplink RF signal. A BalUn circuit has been conventionally included in an uplink communications signal path of a remote unit to convert the combined uplink RF signal into the pair of differential signals for the differential mixer, from the remote unit. By eliminating the signal combiner and the BalUn circuit for example, it is possible to reduce component costs and/or component space on a circuit board in the remote unit. Further, it is also possible to reduce insertion loss and ripple associated with the signal combiner and the BalUn circuit, thus helping to improve uplink signal quality in the remote unit(s) in the WDS.

In this regard, in one aspect, a remote unit in a WDS is provided. The remote unit comprises at least one first uplink signal path configured to receive at least one first uplink RF communications signal in a first RF spectrum. The remote unit also comprises at least one second uplink signal path configured to receive at least one second uplink RF communications signal in a second RF spectrum. The remote unit also comprises a differential mixer. The differential mixer is configured to receive the at least one first uplink RF communications signal as a first RF input signal. The differential mixer is also configured to receive the at least one second uplink RF communications signal as a second RF input signal. The differential mixer is also configured to generate a combined uplink RF communications signal in a first intermediate frequency (IF) spectrum and a second IF spectrum based on the at least one first uplink RF communications signal and the at least one second uplink RF communications signal.

In another aspect, a method for combining uplink RF communications signals in a remote unit in a WDS is provided. The method comprises receiving at least one first uplink RF communications signal in a first RF spectrum by a differential mixer. The method also comprises receiving at least one second uplink RF communications signal in a second RF spectrum by the differential mixer. The method also comprises generating a combined uplink RF communications signal in a first IF spectrum and a second IF spectrum by the differential mixer based on the at least one first uplink RF communications signal and the at least one second uplink RF communications signal.

In another aspect, a WDS is provided. The WDS comprises a plurality of remote units. The plurality of remote units is configured to receive and convert a plurality of downlink digital communications signals into a plurality of downlink RF communications signals for distribution to client devices. The plurality of remote units is also configured to receive a plurality of uplink RF communications signals from the client devices and convert the plurality of uplink RF communications signals into a plurality of uplink digital communications signals. The WDS also comprises a central unit. The central unit is configured to distribute the plurality of downlink digital communications signals to the plurality of remote units over a downlink communications medium. The central unit is also configured to receive the plurality of uplink digital communications signals from the plurality of remote units over an uplink communications medium. Each of the plurality of remote units is configured to receive an uplink RF communications signal comprising at least one first uplink RF communications signal and at least one second uplink RF communications signal among the plurality of uplink RF communications signals. Each of the plurality of remote units comprises at least one first uplink signal path configured to receive the at least one first uplink RF communications signal in a first RF spectrum. Each of the plurality of remote units also comprises at least one second uplink signal path configured to receive the at least one second uplink RF communications signal in a second RF spectrum. Each of the plurality of remote units also comprises a differential mixer. The differential mixer is configured to receive the at least one first uplink RF communications signal as a first RF input signal. The differential mixer is also configured to receive the at least one second uplink RF communications signal as a second RF input signal. The differential mixer is also configured to generate a combined uplink RF communications signal in a first IF spectrum and a second IF spectrum based on the at least one first uplink RF communications signal and the at least one second uplink RF communications signal.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 6A is a schematic diagram providing an exemplary illustration of the differential mixer of FIG. 4 configured to generate a combined uplink RF communications signal based on a first RF input signal, a second RF input signal, a first LO signal, and a second LO signal;

FIG. 6B is a schematic diagram providing an exemplary illustration of the combined uplink RF communications signal of FIG. 6A located in a first intermediate frequency (IF) spectrum and a second IF spectrum;

DETAILED DESCRIPTION

Embodiments of the disclosure relate to combining uplink radio frequency (RF) communications signals in a remote unit in a wireless distribution system (WDS) using a differential mixer. In this regard, in exemplary aspects disclosed herein, one or more remote units in a WDS are configured to receive a first uplink RF communications signal(s) and a second uplink RF communications signal(s). A differential mixer, which is typically configured to combine a pair of differential input signals, is controlled to combine the first uplink RF communications signal(s) and the second uplink RF communications signal(s) without requiring the first uplink RF communications signal(s) and the second uplink RF communications signal(s) to be converted into the pair of differential input signals. As a result, as an example, combining the first uplink RF communications signal(s) and the second uplink RF communications signal(s) using a differential mixer may make it possible to eliminate certain other electrical components. For example, it may be possible to eliminate the need to provide a signal combiner and/or a BalUn circuit in an uplink communications signal path. A signal combiner has been conventionally included in an uplink communications signal path of a remote unit to combine the first uplink RF communications signal(s) and the second uplink RF communications signal(s) into a combined uplink RF signal. A BalUn circuit has been conventionally included in an uplink communications signal path of a remote unit to convert the combined uplink RF signal into the pair of differential signals for the differential mixer, from the remote unit. By eliminating the signal combiner and the BalUn circuit for example, it is possible to reduce component costs and/or component space on a circuit board in the remote unit. Further, it is also possible to reduce insertion loss and ripple associated with the signal combiner and the BalUn circuit, thus helping to improve uplink signal quality in the remote unit(s) in the WDS.

Figure 2:
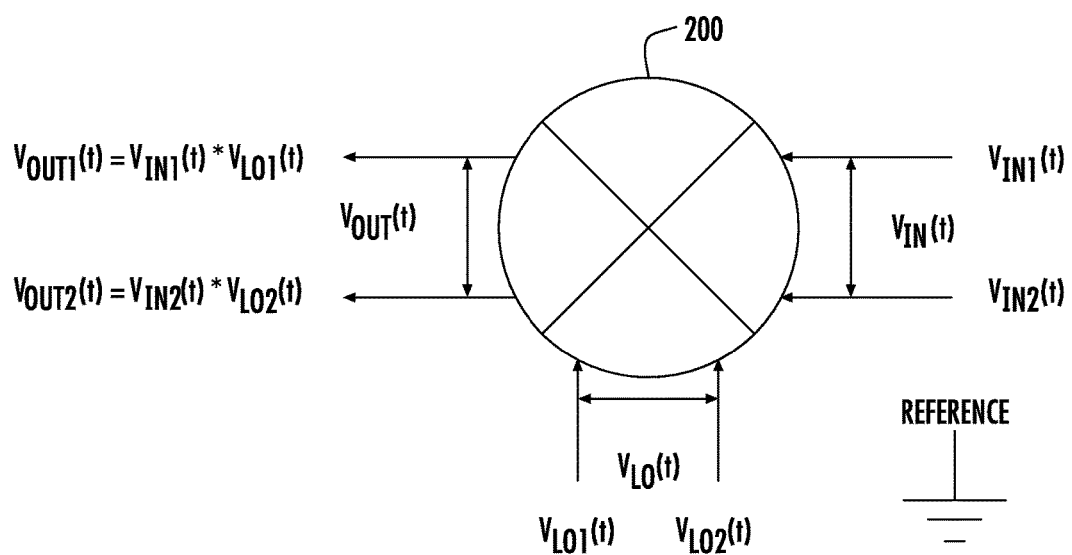
FIG. 2 is a schematic diagram of an exemplary differential mixer configured to combine a differential input signal with a differential local oscillator (LO) signal to generate an output signal.
Figure 3:
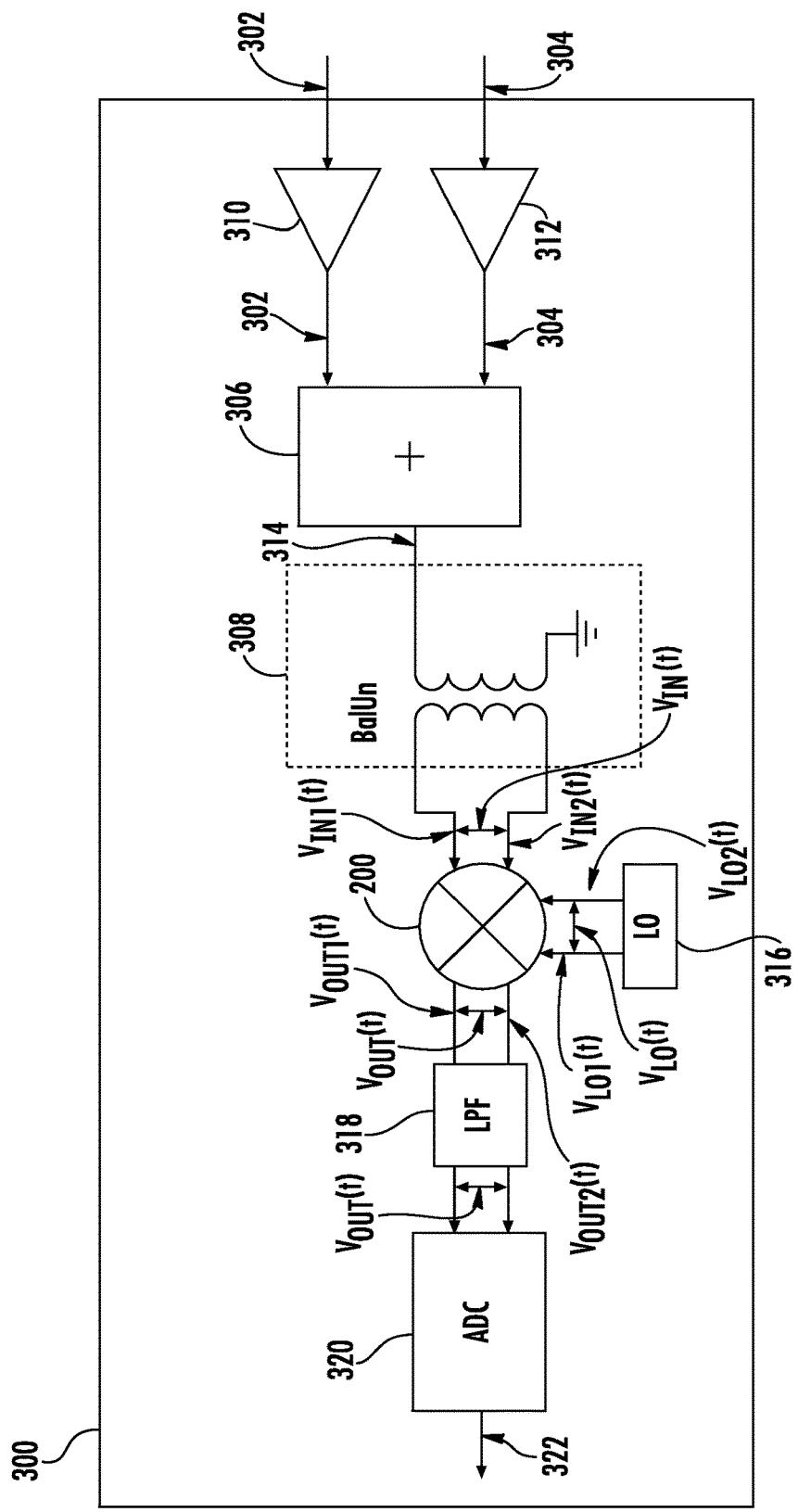
FIG. 3 is a schematic diagram of an exemplary remote unit configured to combine a first uplink radio frequency (RF) signal(s) and a second uplink RF signal(s) based on a signal combiner, a BalUn circuit, and the differential mixer of FIG. 2.
Figure 4:
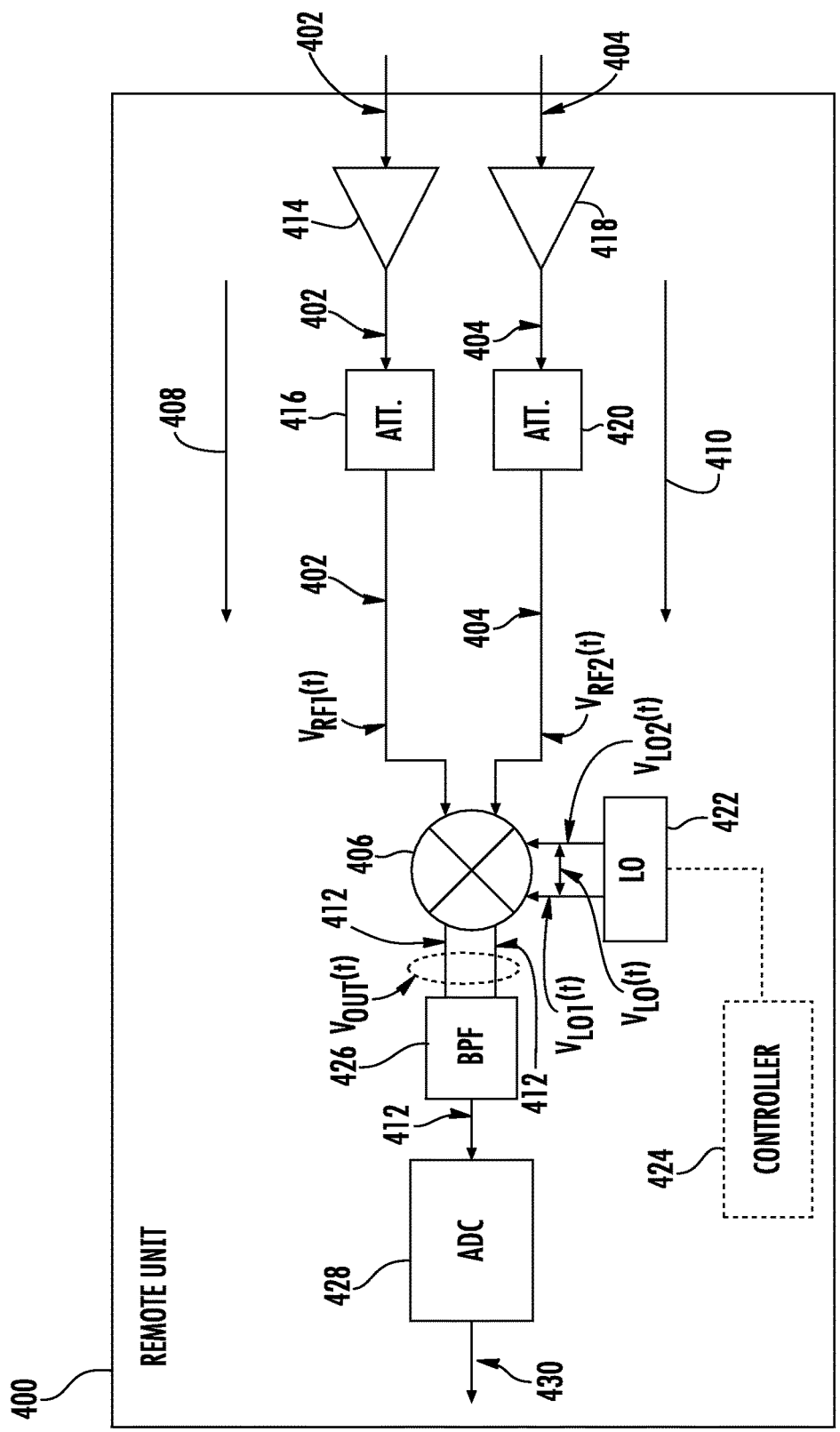
FIG. 4 is a schematic diagram of an exemplary remote unit that includes a differential mixer configured to combine at least one first uplink RF communications signal and at least one second uplink RF communications signal to avoid the need for a signal combiner and/or a BalUn circuit as a non-limiting example.

Before discussing exemplary aspects of combining uplink RF communications signals in a remote unit in a WDS using a differential mixer starting at FIG. 4, a brief overview of a differential mixer is first provided in FIG. 2. An example of combining uplink RF signals based on a signal combiner, a BalUn circuit, and a differential mixer is shown in FIG. 3.

Figure 1:
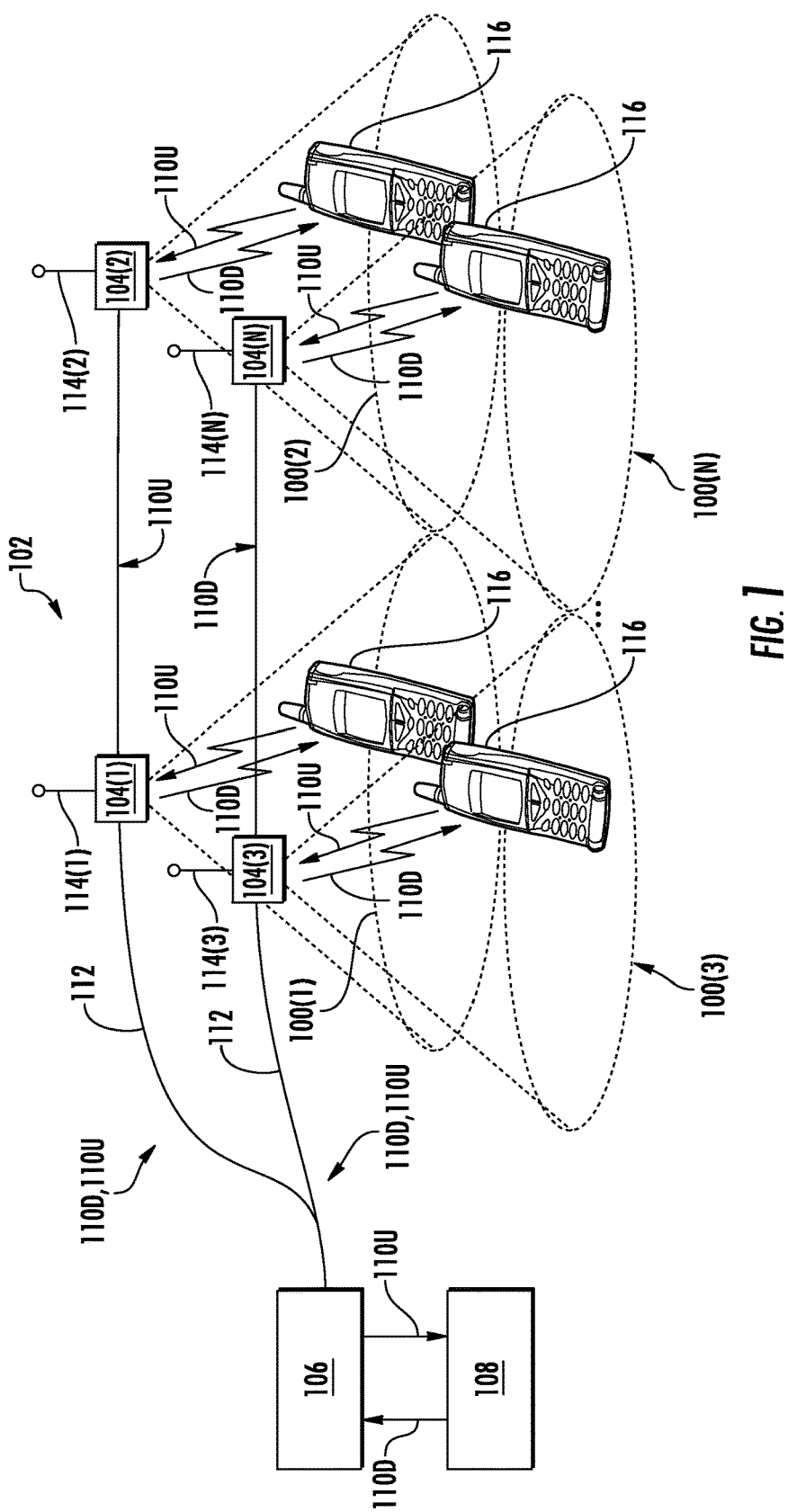
FIG. 1 is a schematic diagram of an exemplary wireless distribution system (WDS), which may be a distributed antenna system (DAS) for example.

FIG. 2 is a schematic diagram of an exemplary differential mixer 200 configured to combine a differential input signal $V_{IN}(t)$ with a differential local oscillator (LO) signal $V_{LO}(t)$ to generate an output signal $V_{OUT}(t)$. The differential mixer 200 of FIG. 2 may be provided in a remote unit in a WDS, such as a remote unit 104(1)-104(N) in the WDS 102 in FIG. 1 for example, to combine uplink RF communications signals. The differential input signal $V_{IN}(t)$ includes a first input signal $V_{IN1}(t)$ and a second input signal $V_{IN2}(t)$. The first input signal $V_{IN1}(t)$ and the second input signal $V_{IN2}(t)$ are complementary signals that can be expressed as $V_{IN1}(t)=-V_{IN2}(t)$. Accordingly, the differential input signal $V_{IN}(t)$ can be expressed by the equation (Eq. 1) below.

$$V_{IN}(t)=V_{IN2}(t)-V_{IN1}(t)=2 \cdot V_{IN2}(t) \quad \text{(Eq. 1)}$$

The differential LO signal $V_{LO}(t)$ includes a first LO signal $V_{LO1}(t)$ and a second LO signal $V_{LO2}(t)$. The first LO signal $V_{LO1}(t)$ and the second LO signal $V_{LO2}(t)$ are a pair of complementary LO signals that can be expressed as $V_{LO1}(t)=-V_{LO2}(t)$. Accordingly, the differential reference signal $V_{LO}(t)$ can be expressed by the equation (Eq. 2) below.

$$V_{LO}(t)=V_{LO2}(t)-V_{LO1}(t)=2 \cdot V_{LO2}(t) \quad \text{(Eq. 2)}$$

The differential mixer 200 mixes the differential input signal $V_{IN}(t)$ with the differential LO signal $V_{LO}(t)$ to generate the output signal $V_{OUT}(t)$ that includes a first output signal $V_{OUT1}(t)$ and a second output signal $V_{OUT2}(t)$. As such, the output signal $V_{OUT}(t)$ can be generated based on the differential input signal $V_{IN}(t)$ and the differential LO signal $V_{LO}(t)$, as shown in the equation (Eq. 3) below.

$$V_{OUT}(t)=V_{OUT2}(t)-V_{OUT1}(t)=V_{IN2}(t) \cdot V_{LO2}(t)-V_{IN1}(t) \cdot V_{LO1}(t) \quad \text{(Eq. 3)}$$

As discussed above, the differential mixer 200 of FIG. 2 may be provided in a remote unit in a WDS to combine uplink RF communications signals. In this regard, FIG. 3 is a schematic diagram of an exemplary remote unit 300 that can be provided in a WDS configured to combine a first uplink RF signal(s) 302 and a second uplink RF signal(s) 304 using a signal combiner 306, a BalUn circuit 308, and the differential mixer 200 of FIG. 2. Common elements and signals between FIGS. 2 and 3 are shown in FIG. 3 with common element numbers.

With reference to FIG. 3, the remote unit 300 includes a first RF circuit 310 and a second RF circuit 312 configured to receive the first uplink RF signal(s) 302 and the second uplink RF signal(s) 304, respectively. In a non-limiting example, the first RF circuit 310 and the second RF circuit 312 are low-noise amplifiers (LNAs) configured to amplify the first uplink RF signal(s) 302 and the second uplink RF signal(s) 304 to desired signal-to-noise ratios (SNRs). The signal combiner 306 combines the first uplink RF signal(s) 302 and the second uplink RF signal(s) 304 to generate a combined uplink RF signal 314. The BalUn circuit 308 receives the combined uplink RF signal 314 and generates the differential input signal $V_{IN}(t)$, which includes the first input signal $V_{IN1}(t)$ and the second input signal $V_{IN2}(t)$, for the differential mixer 200.

The remote unit 300 includes a local oscillator 316 configured to generate the differential LO signal $V_{LO}(t)$, which includes the first LO signal $V_{LO1}(t)$ and the second LO signal $V_{LO2}(t)$, for the differential mixer 200. The differential mixer 200 mixes the differential input signal $V_{IN}(t)$ with the differential LO signal $V_{LO}(t)$ to generate the output signal $V_{OUT}(t)$ according to equation (Eq. 3) above. The output signal $V_{OUT}(t)$ may include desired signal elements and undesired signal elements. In a non-limiting example, the desired signal elements include signal elements of the first output signal $V_{OUT1}(t)$ and the second output signal $V_{OUT2}(t)$ that fall within a desired frequency spectrum. In contrast, the undesired signal elements include signal elements of first output signal $V_{OUT2}(t)$ and the second output signal $V_{OUT2}(t)$ that fall outside the desired frequency spectrum, as well as harmonics and intermodulation products associated with the output signal $V_{OUT}(t)$. As such, the remote unit 300 further includes a low path filter 318 to select the desired signal elements and attenuate undesired signal elements of the output signal $V_{OUT}(t)$. The remote unit 300 further includes an analog-to-digital converter (ADC) 320 that converts the output signal $V_{OUT}(t)$ to an uplink digital signal 322 for communication to a central unit in the WDS.

As discussed above, the remote unit 300 needs to employ the signal combiner 306 and the BalUn circuit 308 to convert the first uplink RF signal(s) 302 and the second uplink RF signal(s) 304 into the first input signal $V_{IN1}(t)$ and the second input signal $V_{IN2}(t)$, respectively, for the differential mixer 200. Given that the first uplink RF signal(s) 302 and the second uplink RF signal(s) 304 can occupy a wide range of frequencies (e.g., from 400 MHz to 4000 MHz), the signal combiner 306 may need to be a broadband signal combiner that is capable of combining signals in the wide range of frequencies. In this regard, the signal combiner 306 and the BalUn circuit 308 will occupy circuit board space in the remote unit 300, and will add to the cost of the remote unit 300. Furthermore, the signal combiner 306 and the BalUn circuit 308 may introduce high insertion loss and ripple in the first input signal $V_{IN1}(t)$ and the second input signal $V_{IN2}(t)$. In a non-limiting example, the signal combiner 306 and the BalUn circuit 308 can introduce more than 6 dB total insertion loss with high ripple, which can potentially corrupt the output signal $V_{OUT}(t)$. Hence, it may be desired to combine uplink RF signals, such as the first uplink RF signal(s) 302 and the second uplink RF signal(s) 304 without using the signal combiner 306 and the BalUn circuit 308, thus saving component costs and component space on a circuit board, as well as reducing insertion loss and ripple caused by the signal combiner 306 and the BalUn circuit 308.

In this regard, FIG. 4 is a schematic diagram of an exemplary remote unit 400 configured to combine at least one first uplink RF communications signal 402 and at least one second uplink RF communications signal 404 by a differential mixer 406 included in the remote unit 400 to avoid the need for a signal combiner and/or a BalUn circuit as a non-limiting example. The remote unit 400 in FIG. 4 can be provided in a WDS, including a DAS. In contrast to the remote unit 300 of FIG. 3, the remote unit 400 in FIG. 4 is configured to combine the first uplink RF communications signal 402 and the second uplink RF communications signal 404 using the differential mixer 406, without the need to employ the signal combiner 306 and the BalUn circuit 308 in FIG. 3. As a result, it may be possible to save component costs and the circuit board space that would be associated with including the signal combiner 306 and the BalUn circuit 308 in the remote unit 400 in FIG. 4. Further, it may be possible to reduce or eliminate the insertion loss and ripple caused by the signal combiner 306 and the BalUn circuit 308, thus improving uplink signal quality in the remote unit 400.

With reference to FIG. 4, the remote unit 400 includes at least one first uplink signal path 408 and at least one second uplink signal path 410 that are coupled to the differential mixer 406. The first uplink signal path 408 is configured to receive the first uplink RF communications signal 402 in a first RF spectrum (e.g., RF channel or band). The second uplink signal path 410 is configured to receive the second uplink RF communications signal 404 in a second RF spectrum (e.g., RF channel or band). The first RF spectrum and the second RF spectrum may occupy a total RF spectrum bandwidth that is greater than 300 MHz. For example, if the first RF spectrum and the second RF spectrum correspond respectively to the 830-845 MHz and the 2010-2025 MHz frequencies, the total RF spectrum bandwidth occupied by the first RF spectrum and the second RF spectrum will be 1195 Mhz (2025 MHz-830 MHz).

Instead of receiving the differential input signal $V_{IN}(t)$ that includes the first input signal $V_{IN1}(t)$ and the second input signal $V_{IN2}(t)$ as the differential mixer 200 of FIGS. 2 and 3, the differential mixer 406 is configured to receive the first uplink RF communications signal 402 as a first RF input signal $V_{RF1}(t)$ and the second uplink RF communications signal 404 as a second RF input signal $V_{RF2}(t)$. Since the first uplink RF communications signal 402 is independent from the second uplink RF communications signal 404, the first RF input signal $V_{RF1}(t)$ and the second RF input signal $V_{RF2}(t)$ are not complementary signals ($V_{RF1}(t) \neq -V_{RF2}(t)$). The differential mixer 406 is configured to combine the first RF input signal $V_{RF1}(t)$ and the second RF input signal $V_{RF2}(t)$ with a differential LO signal $V_{LO}(t)$ to generate a combined uplink RF communications signal 412 in a first intermediate frequency (IF) spectrum and in a second IF spectrum. As is further illustrated in FIG. 6B, the combined uplink RF communications signal 412 in the first IF spectrum is a mirrored signal of the combined uplink RF communications signal 412 in the second IF spectrum.

The remote unit 400 can be configured to combine the first uplink RF communications signal 402 and the second uplink RF communications signal 404 according to a process. In this regard, FIG. 5 is a flowchart of an exemplary process 500 that can be employed in the remote unit 400 of FIG. 4 to generate the combined uplink RF communications signal 412 based on the first uplink RF communications signal 402 and the second uplink RF communications signal 404.

Figure 5:
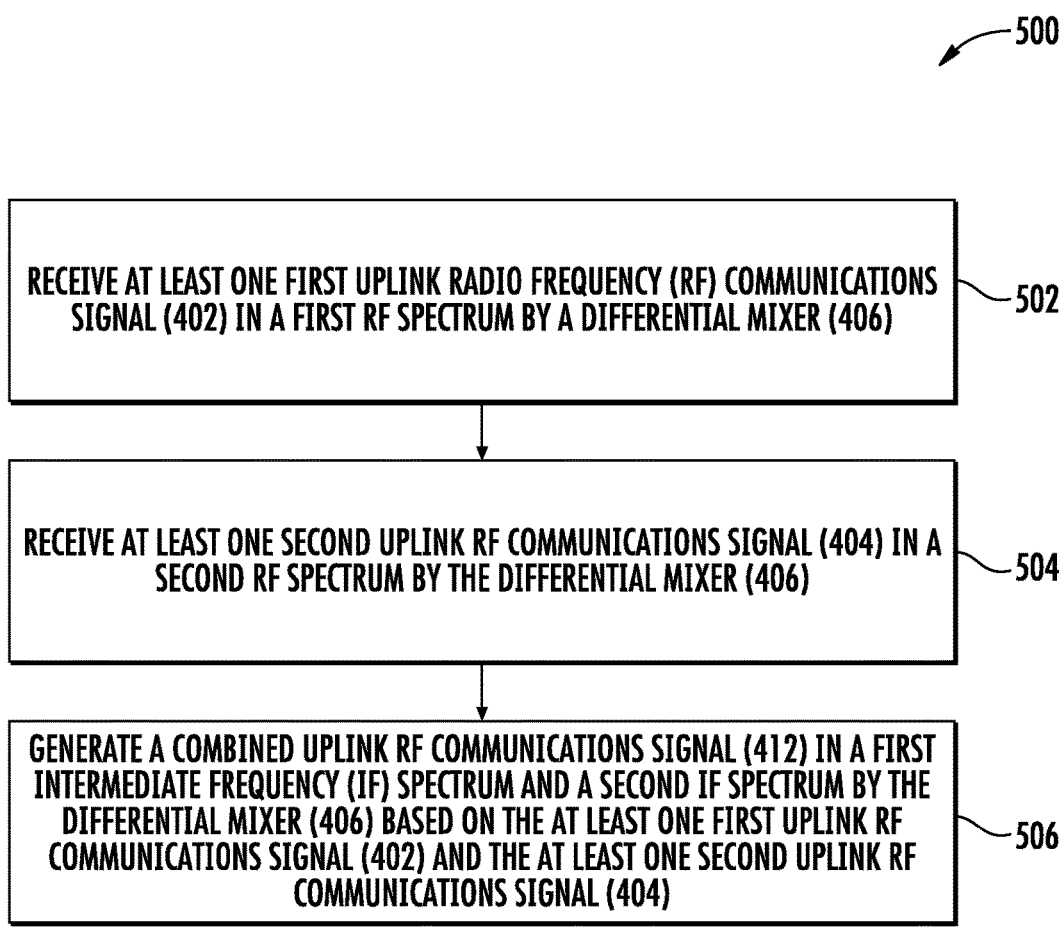
FIG. 5 is a flowchart of an exemplary process that can be employed in the remote unit of FIG. 4 to generate a combined uplink RF communications signal based on the at least one first uplink RF communications signal and the at least one second uplink RF communications signal.

With reference to FIG. 5, the first uplink RF communications signal 402 in the first RF spectrum is received by the differential mixer 406 as the first RF input signal $V_{RF1}(t)$ (block 502). The second uplink RF communications signal 404 in the second RF spectrum is also received by the differential mixer 406 as the second RF input signal $V_{RF2}(t)$ (block 504). As discussed above, the first RF input signal $V_{RF1}(t)$ and the second RF input signal $V_{RF2}(t)$ are not complementary signals. The differential mixer 406 generates the combined uplink RF communications signal 412 in the first IF spectrum and the second IF spectrum based on the first uplink RF communications signal 402 and the second uplink RF communications signal 404 (block 506).

With reference back to FIG. 4, the first uplink signal path 408 includes a first RF circuit 414 and a first attenuator 416. In a non-limiting example, the first RF circuit 414 is an LNA configured to receive and amplify the first uplink RF communications signal 402 to a desired SNR. The first attenuator 416 is configured to minimize impedance mismatch between the first RF circuit 414 and the differential mixer 406. The second uplink signal path 410 includes a second RF circuit 418 and a second attenuator 420. In a non-limiting example, the second RF circuit 418 is an LNA configured to receive and amplify the second uplink RF communications signal 404 to a desired SNR. The second attenuator 420 is configured to minimize impedance mismatch between the second RF circuit 418 and the differential mixer 406.

To further describe operational principles of the differential mixer 406, FIGS. 6A and 6B are discussed next. Common elements between FIGS. 4, 6A, and 6B are shown therein with common element numbers and will not be re-described herein.

In this regard, FIG. 6A is a schematic diagram providing an exemplary illustration of the differential mixer 406 of FIG. 4 configured to generate the combined uplink RF communications signal 412 based on the first RF input signal $V_{RF1}(t)$, the second RF input signal $V_{RF2}(t)$, a first LO signal $V_{LO1}(t)$, and a second LO signal $V_{LO2}(t)$. By substituting the first input signal $V_{IN1}(t)$ and the second input signal $V_{IN2}(t)$ in the equation (Eq. 3) with the first RF input signal $V_{RF1}(t)$ and the second RF input signal $V_{RF2}(t)$, it is possible to express an output signal $V_{OUT}(t)$ generated by the differential mixer 406 in the equation (Eq. 4) below.

$$V_{OUT}(t) = V_{OUT2}(t) - V_{OUT1}(t) = V_{RF2}(t) \cdot V_{LO2}(t) - V_{RF1}(t) \cdot V_{LO1}(t) \qquad \text{(Eq. 4)}$$

Because the first LO signal $V_{LO1}(t)$ and the second LO signal $V_{LO2}(t)$ are complementary signals ($V_{REF1}(t)=-V_{REF2}(t)$), the above equation (Eq. 4) can be transformed into the equation (Eq. 5) below.

$$V_{OUT}(t) = V_{RF2}(t) \cdot V_{LO2}(t) - [V_{RF1}(t) \cdot (-V_{LO2}(t))] \quad \text{(Eq. 5)}$$
$$= (V_{LO}(t)/2) \cdot [V_{RF1}(t) + V_{RF2}(t)]$$

As shown in the equation (Eq. 5) above, the first RF input signal $V_{RF1}(t)$, which corresponds to the first uplink RF communications signal 402, and the second RF input signal $V_{RF2}(t)$, which corresponds to the second uplink RF communications signal 404, appear in the output signal $V_{OUT}(t)$ generated by the differential mixer 406.

According to the discussions above, the output signal $V_{OUT}(t)$ includes the combined uplink RF communications signal 412 in the first IF spectrum and the second IF spectrum. In this regard, FIG. 6B is a schematic diagram providing an exemplary illustration of the combined uplink RF communications signal 412 of FIG. 6A located in the first IF spectrum and the second IF spectrum.

With reference to FIG. 6B, the first RF input signal $V_{RF1}(t)$, the second RF input signal $V_{RF2}(t)$, and the differential LO signal $V_{LO}(t)$ can be expressed in sinusoidal forms, as shown in the equation (Eq. 6) below.

$$V_{RF1}(t)=A \cos \omega_1 t$$
$$V_{RF2}(t)=B \cos \omega_2 t$$
$$V_{REF}(t)=C \cos \omega_{LO} t \quad \text{(Eq. 6)}$$

In the equation (Eq. 5) above, $\omega_1$, $\omega_{02}$, and $\omega_{LO}$ equal $2\pi f_1$, $2\pi f_2$, and $2\pi f_{LO}$, respectively. The frequencies $f_1$, $f_2$, and $f_{LO}$ represent the frequencies of the first RF input signal $V_{RF1}(t)$, the second RF input signal $V_{RF2}(t)$, and the differential LO signal $V_{LO}(t)$, respectively. By substituting the first RF input signal $V_{RF1}(t)$, the second RF input signal $V_{RF2}(t)$, and the differential LO signal $V_{LO}(t)$ in the equation (Eq. 5) with respective sinusoidal expressions in the equation (Eq. 6), it is possible to transform the equation (Eq. 5) to the equation (Eq. 7) below.

$$V_{OUT}(t) = \frac{V_{LO}(t)}{2} \cdot [V_{RF1}(t) + V_{RF2}(t)] = \quad \text{(Eq. 7)}$$
$$\frac{C}{2} \cdot \cos\omega_{LO} t \cdot [A\cos\omega_1 t + B\cos\omega_2 t]$$
$$V_{OUT}(t) = A \cdot \frac{C}{2} \cdot (\cos\omega_1 t) \cdot (\cos\omega_{LO} t) + B \cdot \frac{C}{2} \cdot (\cos\omega_2 t) \cdot (\cos\omega_{LO} t)$$

The equation (Eq. 7) can be further transformed to the equation (Eq. 8) below by expressing the first RF input signal $V_{RF1}(t)$, the second RF input signal $V_{RF2}(t)$, and the differential LO signal $V_{LO}(t)$ in trigonometric forms.

$$V_{OUT}(\omega) = \quad \text{(Eq. 8)}$$
$$\frac{C}{4}[(A+B) \cdot (\cos\omega_1 - \cos\omega_{LO}) + (A+B) \cdot (\cos\omega_1 + \omega_{LO})] +$$
$$\frac{C}{4}[(A+B) \cdot (\cos\omega_2 - \cos\omega_{LO}) + (A+B) \cdot (\cos\omega_2 + \omega_{LO})]$$

As shown in FIG. 6B, the trigonometric expression $V_{OUT}(\omega)$ of the output signal $V_{OUT}(t)$ includes the combined uplink RF communications signal 412 in the first IF spectrum and the second IF spectrum. The combined uplink RF communications signal 412 in the first IF spectrum includes the first uplink RF communications signal 402 at an intermediate frequency ($\omega_1-\omega_{LO}$) and the second uplink RF communications signal 404 at an intermediate frequency ($\omega_2-\omega_{LO}$). In this regard, the combined uplink RF communications signal 412 in the second IF spectrum includes the first uplink RF communications signal 402 at an intermediate frequency ($\omega_1+\omega_{LO}$) and the second uplink RF communications signal 404 at an intermediate frequency ($\omega_2+\omega_{LO}$). The combined uplink RF communications signal 412 has amplitude of (C·(A+B)/4). It is evident that the differential mixer 406 can generate the combined uplink RF communications signal 412 that includes the first uplink RF communications signal 402 and the second uplink RF communications signal 404 without converting the first uplink RF communications signal 402 and the second uplink RF communications signal 404 into the differential input signal $V_{IN}(t)$ of FIG. 3. Hence, it is possible to eliminate the signal combiner 306 and the BalUn circuit 308 of FIG. 3 from the remote unit 400, thus helping to save component costs and component space on a circuit board and reduce insertion loss and ripple in the remote unit 400.

As described above, $\omega_1$, $\omega_2$, and $\omega_{LO}$ in equation (Eq. 8) equal $2\pi f_1$, $2\pi f_2$, and $2\pi f_{LO}$, respectively. The frequencies $f_1$, $f_2$, and $f_{LO}$ represent the frequencies of the first RF input signal $V_{RF1}(t)$, the second RF input signal $V_{RF2}(t)$, and the differential LO signal $V_{LO}(t)$, respectively. As such, the intermediate frequency ($\omega_1-\omega_{LO}$) and the intermediate frequency ($\omega_2-\omega_{LO}$) in the first IF spectrum in FIG. 6B can be expressed as ($2\pi f_1-2\pi f_{LO}$) and ($2\pi f_2-2\pi f_{LO}$), respectively. Likewise, the intermediate frequency ($\omega_1+\omega_{LO}$) and the intermediate frequency ($\omega_2+\omega_{LO}$) in the second IF spectrum can be expressed as ($2\pi f_1+2\pi f_{LO}$) and ($2\pi f_2+2\pi f_{LO}$), respectively. In this regard, by controlling the LO frequency $f_{LO}$ of the differential LO signal $V_{LO}(t)$, it is possible to control the differential mixer 406 to generate the combined uplink RF communications signal 412 in a desired IF spectrum.

With reference back to FIG. 4, the remote unit 400 includes a local oscillator 422 configured to provide the differential LO signal $V_{LO}(t)$, which includes the first LO signal $V_{LO1}(t)$ and the second LO signal $V_{LO2}(t)$, to the differential mixer 406. The remote unit 400 includes a controller 424, which may be a microprocessor or a microcontroller for example. The controller 424 is configured to control the local oscillator 422 to generate the differential LO signal $V_{LO}(t)$ at the LO frequency $f_{LO}$ to cause the differential mixer 406 to generate the combined uplink RF communications signal 412 in the first IF spectrum and the second IF spectrum.

The remote unit 400 also includes a band path filter 426 configured to output the combined uplink RF communications signal 412 located in a selected IF spectrum among the first IF spectrum and the second IF spectrum of FIG. 6B. In one non-limiting example, the band path filter 426 is a low path filter that outputs the combined uplink RF communications signal 412 located in the first IF spectrum. In another non-limiting example, the band path filter 426 is a high path filter that outputs the combined uplink RF communications signal 412 located in the second IF spectrum. In addition, the band path filter 426 is configured to attenuate harmonics and intermodulation products associated with the combined uplink RF communications signal 412. The remote unit 400 further includes an ADC 428 configured to receive and convert the combined uplink RF communications signal 412 into an uplink digital communications signal 430 to be communicated to a central unit in a WDS.

As previously discussed, the first uplink RF communications signal 402 and the second uplink RF communications signal 404 are received in the first RF spectrum and the second RF spectrum, respectively. The first RF spectrum and the second RF spectrum may occupy a total RF spectrum bandwidth that is greater than 300 MHz. However, the ADC 428 may have a limited processing bandwidth of 300 MHz for example. In this regard, the controller 424 is configured to control the local oscillator 422 to generate the differential LO signal $V_{LO}(t)$ at the LO frequency $f_{LO}$ that will cause the first IF spectrum and the second IF spectrum to have respective IF spectrum bandwidths less than or equal to 300 MHz. As such, the ADC 428 will be able to process the combined uplink RF communications signal 412 output by the band path filter 426.

Figure 7:
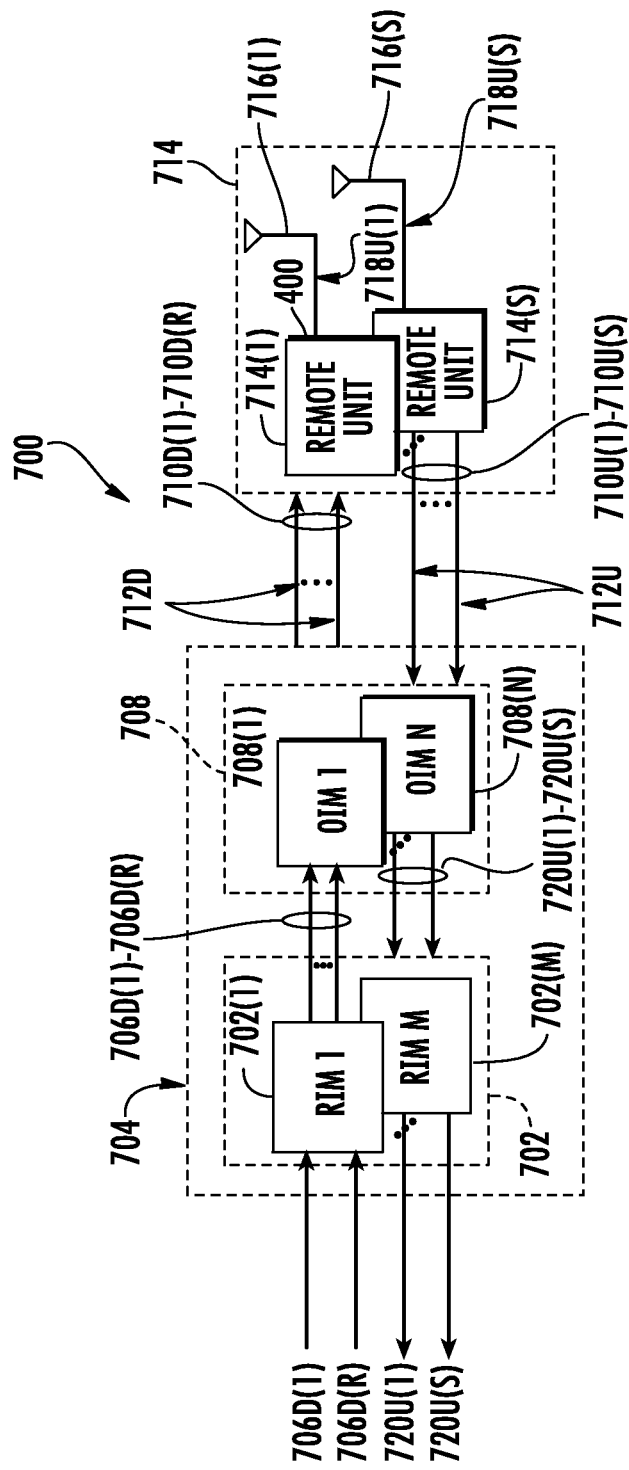
FIG. 7 is a schematic diagram of an exemplary WDS provided in the form of an optical fiber-based WDS that can include a plurality of remote units, including the remote unit of FIG. 4, configured to combine the at least one first uplink RF communications signal and the at least one second uplink RF communications signal using the differential mixer.

FIG. 7 is a schematic diagram of an exemplary WDS 700 provided in the form of an optical fiber-based WDS that can include a plurality of remote units, including the remote unit 400 of FIG. 4, configured to combine the first uplink RF communications signal 402 and the second uplink RF communications signal 404 using the differential mixer 406. The WDS 700 includes an optical fiber for distributing communications services for multiple frequency bands. The WDS 700 in this example is comprised of three (3) main components. A plurality of radio interfaces provided in the form of radio interface modules (RIMs) 702(1)-702(M) are provided in a central unit 704 to receive and process a plurality of downlink digital communications signals 706D(1)-706D(R) prior to optical conversion into downlink optical fiber-based communications signals. The downlink digital communications signals 706D(1)-706D(R) may be received from a base station as an example. The RIMs 702(1)-702(M) provide both downlink and uplink interfaces for signal processing. The notations "1-R" and "1-M" indicate that any number of the referenced component, 1-R and 1-M, respectively, may be provided. The central unit 704 is configured to accept the RIMs 702(1)-702(M) as modular components that can easily be installed and removed or replaced in the central unit 704. In one example, the central unit 704 is configured to support up to twelve (12) RIMs 702(1)-702(12). Each RIM 702(1)-702(M) can be designed to support a particular type of radio source or range of radio sources (i.e., frequencies) to provide flexibility in configuring the central unit 704 and the WDS 700 to support the desired radio sources.

For example, one RIM 702 may be configured to support the Personalized Communications System (PCS) radio band. Another RIM 702 may be configured to support the 800 MHz radio band. In this example, by inclusion of the RIMs 702(1)-702(M), the central unit 704 could be configured to support and distribute communications signals on both PCS and Long-Term Evolution (LTE) 700 radio bands, as an example. The RIMs 702(1)-702(M) may be provided in the central unit 704 that support any frequency bands desired, including but not limited to the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 702(1)-702(M) may also be provided in the central unit 704 that support any wireless technologies desired, including but not limited to Code Division Multiple Access (CDMA), CDMA200, 1xRTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 702(1)-702(M) may be provided in the central unit 704 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 7, the downlink digital communications signals 706D(1)-706D(R) are provided to a plurality of optical interfaces provided in the form of optical interface modules (OIMs) 708(1)-708(N) in this embodiment to convert the downlink digital communications signals 706D(1)-706D(R) into a plurality of downlink optical fiber-based communications signals 710D(1)-710D(R). The notation "1-N" indicates that any number of the referenced component 1-N may be provided. The OIMs 708(1)-708(N) may be configured to provide a plurality of optical interface components (OICs) that contain optical-to-electrical (O/E) and electrical-to-optical (E/O) converters, as will be described in more detail below. The OIMs 708(1)-708(N) support the radio bands that can be provided by the RIMs 702(1)-702(M), including the examples previously described above.

The OIMs 708(1)-708(N) each include E/O converters to convert the downlink digital communications signals 706D(1)-706D(R) into the downlink optical fiber-based communications signals 710D(1)-710D(R). The downlink optical fiber-based communications signals 710D(1)-710D(R) are communicated over a downlink optical fiber-based communications medium 712D to a plurality of remote units 714(1)-714(S). Each of the remote units 714(1)-714(S) is provided as the remote unit 400 of FIG. 4 configured to combine the first uplink RF communications signal 402 and the second uplink RF communications signal 404 using the differential mixer 406. The notation "1-S" indicates that any number of the referenced component 1-S may be provided. Remote unit O/E converters provided in the remote units 714(1)-714(S) convert the downlink optical fiber-based communications signals 710D(1)-710D(R) back into the downlink digital communications signals 706D(1)-706D (R), which are the converted into a plurality of downlink RF communications signals and provided to antennas 716(1)-716(S) in the remote units 714(1)-714(S) to client devices in the reception range of the antennas 716(1)-716(S).

The remote units 714(1)-714(S) receive a plurality of uplink RF communications signals from the client devices through the antennas 716(1)-716(S). In this regard, each of the remote units 714(1)-714(S) receives the first uplink RF communications signal 402 and the second uplink RF communications signal 404 in an uplink RF communications signal among the uplink RF communications signals. The remote units 714(1)-714(S) covert the uplink RF communications signals into a plurality of uplink digital communications signals 718U(1)-718U(S). In this regard, each of the remote units 714(1)-714(S) generates the uplink digital communications signal 430 among the uplink digital communications signals 718U(1)-718U(S). Remote unit E/O converters are also provided in the remote units 714(1)-714(S) to convert the uplink digital communications signals 718U(1)-718U(S) into a plurality of uplink optical fiber-based communications signals 710U(1)-710U(S). The remote units 714(1)-714(S) communicate the uplink optical fiber-based communications signals 710U(1)-710U(S) over an uplink optical fiber-based communications medium 712U to the OIMs 708(1)-708(N) in the central unit 704. The OIMs 708(1)-708(N) include O/E converters that convert the received uplink optical fiber-based communications signals 710U(1)-710U(S) into uplink digital communications signals 720U(1)-720U(S), which are processed by the RIMs 702(1)-702(M) and provided as the uplink digital communications signals 720U(1)-720U(S). The central unit 704 may provide the uplink digital communications signals 720U(1)-720U(S) to a base station or other communications system.

Note that the downlink optical fiber-based communications medium 712D and the uplink optical fiber-based communications medium 712U connected to each of the remote units 714(1)-714(S) may be a common optical fiber-based communications medium, wherein for example, wave division multiplexing (WDM) is employed to provide the downlink optical fiber-based communications signals 710D(1)-710D(R) and the uplink optical fiber-based communications signals 710U(1)-710U(S) on the same optical fiber-based communications medium.

Figure 8:
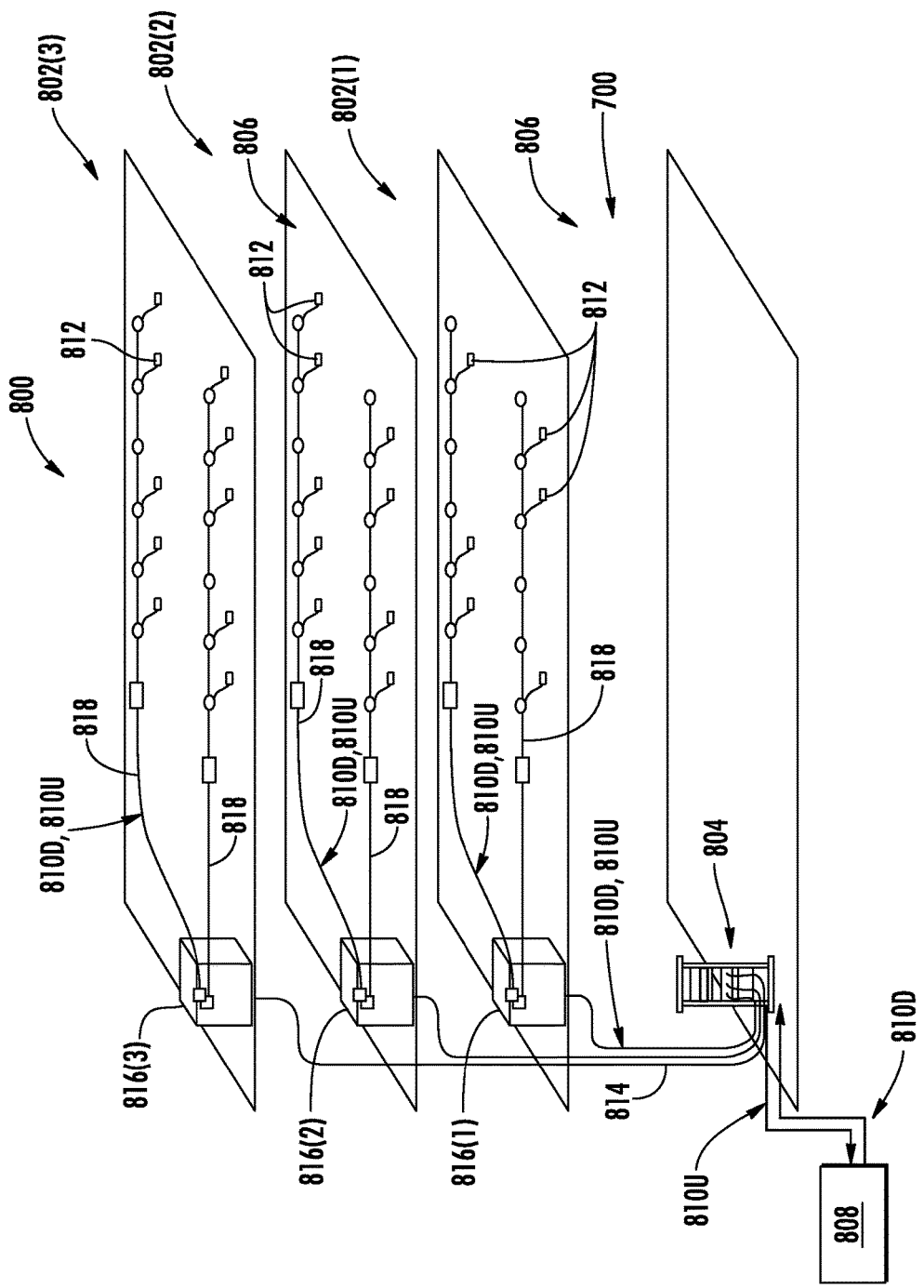
FIG. 8 is a partial schematic cut-away diagram of an exemplary building infrastructure in which a WDS, such as the WDS of FIG. 7, including a plurality of remote units, such as the remote unit of FIG. 4, can be configured to combine the at least one first uplink RF communications signal and the at least one second uplink RF communications signal using the differential mixer.

The WDS 700 of FIG. 7 may be provided in an indoor environment, as illustrated in FIG. 8. FIG. 8 is a partial schematic cut-away diagram of an exemplary building infrastructure 800 in which a WDS, such as the WDS 700 of FIG. 7, including the remote unit 400 of FIG. 4, can be configured to combine the first uplink RF communications signal 402 and the second uplink RF communications signal 404 using the differential mixer 406. The building infrastructure 800 in this embodiment includes a first (ground) floor 802(1), a second floor 802(2), and a third floor 802(3). The floors 802(1)-802(3) are serviced by a central unit 804 to provide antenna coverage areas 806 in the building infrastructure 800. The central unit 804 is communicatively coupled to a base station 808 to receive downlink communications signals 810D from the base station 808. The central unit 804 is communicatively coupled to a plurality of remote units 812 to distribute the downlink communications signals 810D to the remote units 812 and to receive uplink communications signals 810U from the remote units 812, as previously discussed above. The downlink communications signals 810D and the uplink communications signals 810U communicated between the central unit 804 and the remote units 812 are carried over a riser cable 814. The riser cable 814 may be routed through interconnect units (ICUs) 816(1)-816(3) dedicated to each of the floors 802(1)-802(3) that route the downlink communications signals 810D and the uplink communications signals 810U to the remote units 812 and also provide power to the remote units 812 via array cables 818.

Figure 9:
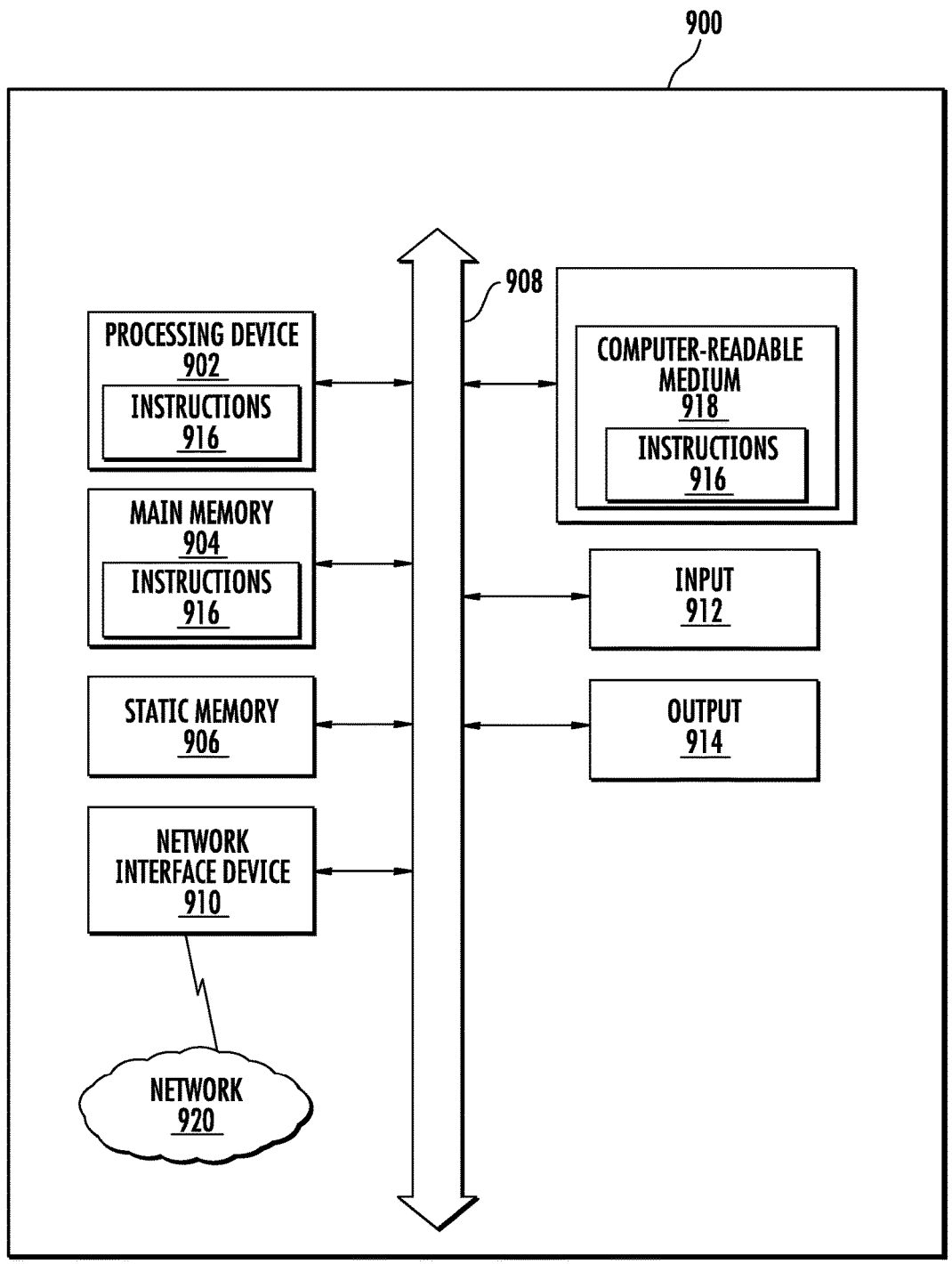
FIG. 9 is a schematic diagram representation of additional detail illustrating an exemplary computer system that could be employed in a controller, including a controller in the remote unit of FIG. 4, for controlling a local oscillator to generate a differential LO signal.

FIG. 9 is a schematic diagram representation of additional detail illustrating an exemplary computer system 900 that could be employed in a controller, including the controller 424 in the remote unit 400 of FIG. 4, for controlling the local oscillator 422 for generating the differential LO signal $V_{LO}(t)$. In this regard, the computer system 900 is adapted to execute instructions from an exemplary computer-readable medium to perform these and/or any of the functions or processing described herein.

In this regard, the computer system 900 in FIG. 9 may include a set of instructions that may be executed to predict frequency interference to avoid or reduce interference in a multi-frequency DAS. The computer system 900 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 900 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 900 in this embodiment includes a processing device or processor 902, a main memory 904 (e.g., read-only memory (ROM), flash memory, dynamic random access memory (DRAM), such as synchronous DRAM (SDRAM), etc.), and a static memory 906 (e.g., flash memory, static random access memory (SRAM), etc.), which may communicate with each other via a data bus 908. Alternatively, the processor 902 may be connected to the main memory 904 and/or the static memory 906 directly or via some other connectivity means. The processor 902 may be a controller, and the main memory 904 or the static memory 906 may be any type of memory.

The processor 902 represents one or more general-purpose processing devices, such as a microprocessor, central processing unit, or the like. More particularly, the processor 902 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 902 is configured to execute processing logic in instructions for performing the operations and steps discussed herein.

The computer system 900 may further include a network interface device 910. The computer system 900 also may or may not include an input 912, configured to receive input and selections to be communicated to the computer system 900 when executing instructions. The computer system 900 also may or may not include an output 914, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer-readable medium 918. The instructions 916 may also reside, completely or at least partially, within the main memory 904 and/or within the processor 902 during execution thereof by the computer system 900, the main memory 904 and the processor 902 also constituting computer-readable medium. The instructions 916 may further be transmitted or received over a network 920 via the network interface device 910.

While the computer-readable medium 918 is shown in an exemplary embodiment to be a single medium, the term "computer-readable medium" should be taken to include a single medium or multiple media (e.g., a centralized or distributed database, and/or associated caches and servers)

that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A remote unit in a wireless distribution system (WDS), comprising:
   at least one first uplink signal path configured to receive at least one first uplink radio frequency (RF) communications signal in a first RF spectrum;
   at least one second uplink signal path configured to receive at least one second uplink RF communications signal in a second RF spectrum; and
   a differential mixer configured to:
      receive the at least one first uplink RF communications signal as a first RF input signal;
      concurrently receive the at least one second uplink RF communications signal as a second RF input signal; and
      generate a combined uplink RF communications signal in a first intermediate frequency (IF) spectrum and a second IF spectrum based on the at least one first uplink RF communications signal and the at least one second uplink RF communications signal.

2. The remote unit of claim 1, configured to receive the at least one first uplink RF communications signal and the at least one second uplink RF communications signal in the first RF spectrum and the second RF spectrum, the first RF spectrum and the second RF spectrum occupying a total RF spectrum bandwidth greater than 300 MHz.

3. The remote unit of claim 1, wherein the differential mixer is configured to generate the combined uplink RF communications signal in the first IF spectrum and the second IF spectrum, each of the first IF spectrum and the second IF spectrum having a respective IF spectrum bandwidth less than or equal to 300 MHz.

4. The remote unit of claim 1, further comprising a local oscillator configured to provide a differential local oscillator signal comprising a pair of complementary local oscillator signals to the differential mixer, wherein the differential mixer is configured to combine the pair of complementary local oscillator signals with the at least one first uplink RF communications signal and the at least one second uplink RF communications signal to generate the combined uplink RF communications signal in the first IF spectrum and the second IF spectrum.

5. The remote unit of claim 4, further comprising a controller configured to control the local oscillator to generate the differential local oscillator signal at a local oscillator frequency to cause the differential mixer to generate the combined uplink RF communications signal in the first IF spectrum and the second IF spectrum.

6. The remote unit of claim 1, further comprising a band path filter configured to output the combined uplink RF communications signal located in a selected IF spectrum among the first IF spectrum and the second IF spectrum.

7. The remote unit of claim 6, wherein the band path filter is further configured to attenuate harmonics and intermodulation products associated with the combined uplink RF communications signal.

8. The remote unit of claim 1, further comprising an analog-to-digital converter (ADC) configured to receive and convert the combined uplink RF communications signal into an uplink digital communications signal.

9. The remote unit of claim 1, configured not to include a signal combiner and a BalUn circuit in the at least one first uplink signal path and the at least one second uplink signal path.

10. A method for combining uplink radio frequency (RF) communications signals in a remote unit in a wireless distribution system (WDS), comprising:
    receiving, at least one first uplink RF communications signal in a first RF spectrum by a differential mixer;
    concurrently receiving at least one second uplink RF communications signal in a second RF spectrum by the differential mixer; and
    generating a combined uplink RF communications signal in a first intermediate frequency (IF) spectrum and a second IF spectrum by the differential mixer based on the at least one first uplink RF communications signal and the at least one second uplink RF communications signal.

11. The method of claim 10, further comprising providing a differential local oscillator signal comprising a pair of complementary local oscillator signals from a local oscillator to the differential mixer.

12. The method of claim 11, further comprising controlling the local oscillator to generate the differential local oscillator signal at a local oscillator frequency to cause the differential mixer to generate the combined uplink RF communications signal in the first IF spectrum and the second IF spectrum.

13. The method of claim 10, further comprising outputting the combined uplink RF communications signal located in a selected IF spectrum among the first IF spectrum and the second IF spectrum.

14. The method of claim 13, further comprising attenuating harmonics and intermodulation products associated with the combined uplink RF communications signal.

15. The method of claim 10, further comprising converting the combined uplink RF communications signal into an uplink digital communications signal.

16. A wireless distribution system (WDS), comprising:
a plurality of remote units configured to:
  receive and convert a plurality of downlink digital communications signals into a plurality of downlink radio frequency (RF) communications signals for distribution to client devices;
  concurrently receive a plurality of uplink RF communications signals from the client devices and convert the plurality of uplink RF communications signals into a plurality of uplink digital communications signals; and
a central unit configured to:
  distribute the plurality of downlink digital communications signals to the plurality of remote units over a downlink communications medium; and
  receive the plurality of uplink digital communications signals from the plurality of remote units over an uplink communications medium;
wherein each of the plurality of remote units is configured to receive an uplink RF communications signal comprising at least one first uplink RF communications signal and at least one second uplink RF communications signal among the plurality of uplink RF communications signals, each of the plurality of remote units comprising:
  at least one first uplink signal path configured to receive the at least one first uplink RF communications signal in a first RF spectrum;
  at least one second uplink signal path configured to receive the at least one second uplink RF communications signal in a second RF spectrum; and
  a differential mixer configured to:
    receive the at least one first uplink RF communications signal as a first RF input signal;
    receive the at least one second uplink RE communications signal as a second RF input signal; and
    generate a combined uplink RF communications signal in a first intermediate frequency (IF) spectrum and a second IF spectrum based on the at least one first uplink RF communications signal and the at least one second uplink RF communications signal.

17. The WDS of claim 16, wherein each of the plurality of remote units is configured to receive the at least one first uplink RF communications signal and the at least one second uplink RF communications signal in the first RF spectrum and the second RF spectrum, the first RF spectrum and the second RF spectrum occupying a total RF spectrum bandwidth greater than 300 MHz.

18. The WDS of claim 16, wherein the differential mixer is configured to generate the combined uplink RF communications signal in the first IF spectrum and the second IF spectrum, each of the first IF spectrum and the second IF spectrum having a respective IF spectrum bandwidth less than or equal to 300 MHz.

19. The WDS of claim 16, wherein each of the plurality of remote units further comprises a local oscillator configured to provide a differential local oscillator signal comprising a pair of complementary local oscillator signals to the differential mixer, wherein the differential mixer is configured to combine the pair of complementary local oscillator signals with the at least one first uplink RF communications signal and the at least one second uplink RF communications signal to generate the combined uplink RF communications signal in the first IF spectrum and the second IF spectrum.

20. The WDS of claim 19, wherein each of the plurality of remote units further comprises a controller configured to control the local oscillator to generate the differential local oscillator signal at a local oscillator frequency to cause the differential mixer to generate the combined uplink RF communications signal in the first IF spectrum and the second IF spectrum.

21. The WDS of claim 16, wherein each of the plurality of remote units further comprises a band path filter configured to output the combined uplink RF communications signal located in a selected IF spectrum among the first IF spectrum and the second IF spectrum.

22. The WDS of claim 21, wherein the band path filter is further configured to attenuate harmonics and intermodulation products associated with the combined uplink RF communications signal.

23. The WDS of claim 16, wherein each of the plurality of remote units further comprises an analog-to-digital converter (ADC) configured to receive and convert the combined uplink RF communications signal into an uplink digital communications signal among the plurality of uplink digital communications signals.

24. The WDS of claim 16, wherein each of the plurality of remote units is configured not to include a signal combiner and a BalUn circuit in the at least one first uplink signal path and the at least one second uplink signal path.

25. The WDS of claim 16, wherein:
the central unit comprises electrical-to-optical (E/O) converters configured to convert the plurality of downlink digital communications signals into a plurality of downlink optical fiber-based communications signals for distribution to the plurality of remote units over a downlink optical fiber-based communications medium;
the plurality of remote units comprises:
  remote unit optical-to-electrical (O/E) converters configured to convert the plurality of downlink optical fiber-based communications signals into the plurality of downlink digital communications signals; and
  remote unit E/O converters configured to convert the plurality of uplink digital communications signals into a plurality of uplink optical fiber-based communications signals; and
the central unit further comprises O/E converters configured to convert the plurality of uplink optical fiber-based communications signals received from the plurality of remote units over an uplink optical fiber-based communications medium into the plurality of uplink digital communications signals.

* * * * *

UNITED STATES PATENT AND TRADEMARK OFFICE
CERTIFICATE OF CORRECTION

| | |
|---|---|
| PATENT NO. | : 10,063,318 B2 |
| APPLICATION NO. | : 15/366144 |
| DATED | : August 28, 2018 |
| INVENTOR(S) | : Dror Ben-Shlomo |

It is certified that error appears in the above-identified patent and that said Letters Patent is hereby corrected as shown below:

In the Claims

In Column 16, Line 50, Claim 10, delete "receiving," and insert -- receiving --, therefor.

In Column 17, Line 48, Claim 16, delete "RE" and insert -- RF --, therefor.

Signed and Sealed this
Tenth Day of December, 2024

Katherine Kelly Vidal
*Director of the United States Patent and Trademark Office*